US010036323B2

United States Patent
Hurlin et al.

(10) Patent No.: US 10,036,323 B2
(45) Date of Patent: Jul. 31, 2018

(54) REAR NACELLE ASSEMBLY FOR A TURBOJET ENGINE

(71) Applicant: AIRCELLE, Gonfreville l'Orcher (FR)

(72) Inventors: Herve Hurlin, Igny (FR); Nicolas Dezeustre, Le Havre (FR); Olivier Kerbler, Antony (FR)

(73) Assignee: AIRCELLE, Gonfreville l'Orcher (FR)

( * ) Notice: Subject to any disclaimer, the term of this patent is extended or adjusted under 35 U.S.C. 154(b) by 526 days.

(21) Appl. No.: 14/200,365

(22) Filed: Mar. 7, 2014

(65) Prior Publication Data
US 2014/0234090 A1    Aug. 21, 2014

Related U.S. Application Data

(63) Continuation of application No. PCT/FR2012/052005, filed on Sep. 7, 2012.

(30) Foreign Application Priority Data

Sep. 16, 2011    (FR) ..................................... 11 58247

(51) Int. Cl.
*F02C 7/20* (2006.01)
*B64D 29/06* (2006.01)
(Continued)

(52) U.S. Cl.
CPC ................ *F02C 7/20* (2013.01); *B64D 29/06* (2013.01); *B64D 29/08* (2013.01); *F02K 1/72* (2013.01)

(58) Field of Classification Search
CPC ........... F02C 7/20; B64D 29/06; B64D 29/08; F02K 1/72
See application file for complete search history.

(56) References Cited

U.S. PATENT DOCUMENTS

| 4,442,987 A | * | 4/1984 | Legrand | .................... F02K 1/72 60/226.2 |
| 4,683,717 A | * | 8/1987 | Naud | ........................ F02K 3/06 60/226.1 |

(Continued)

FOREIGN PATENT DOCUMENTS

| EP | 0 055 163 A1 | 6/1982 |
| EP | 0 155 887 A1 | 9/1985 |
| FR | 2 914 700 A1 | 10/2008 |

OTHER PUBLICATIONS

International Search Report dated Oct. 24, 2012 in International Application No. PCT/FR2012/052005.

*Primary Examiner* — Ted Kim
(74) *Attorney, Agent, or Firm* — Burris Law, PLLC

(57) ABSTRACT

A rear nacelle assembly for turbojet engine includes an inner structure surrounding a downstream portion of the turbojet engine. In particular, the inner structure is movable in rotation between an operating position in which it forms a downstream fairing and defines an annular stream of cold air with a thrust reverser cowl, and a maintenance position in which the inner structure moves away from the downstream portion. A suspension pylon is further provided to mount the thrust reverser cowl and the inner structure. The thrust reverser cowl slides between an opening position clearing air flow deviation grids and a closing position recovering the air flow deviation grids. Moreover, the thrust reverser cowl is mounted on the suspension pylon by a pivot connection sliding around a main axis, and the inner structure is mounted on the suspension pylon by a pivot connection around the main axis.

20 Claims, 8 Drawing Sheets

(51) Int. Cl.
*B64D 29/08* (2006.01)
*F02K 1/72* (2006.01)

(56) References Cited

U.S. PATENT DOCUMENTS

| | | | |
|---|---|---|---|
| 6,170,253 B1* | 1/2001 | Newton | F02K 1/72 239/265.31 |
| 2002/0125370 A1* | 9/2002 | Dehu | F02K 1/72 244/110 B |
| 2004/0159741 A1* | 8/2004 | Sternberger | F02K 1/72 244/110 B |
| 2010/0107599 A1* | 5/2010 | Vauchel | F02K 1/72 60/226.2 |

* cited by examiner

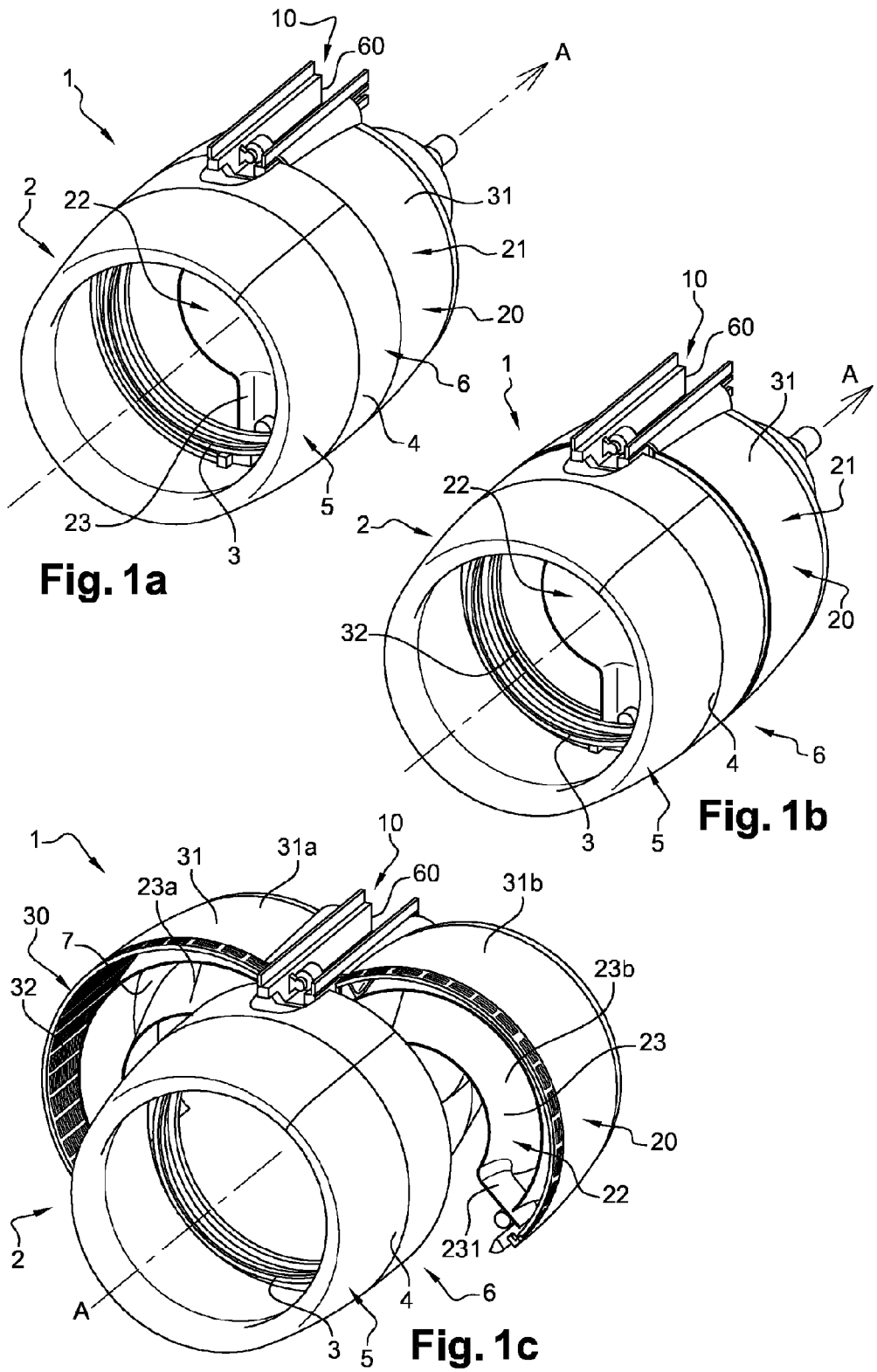

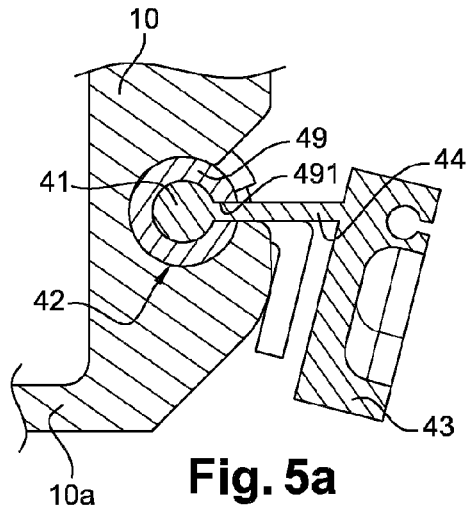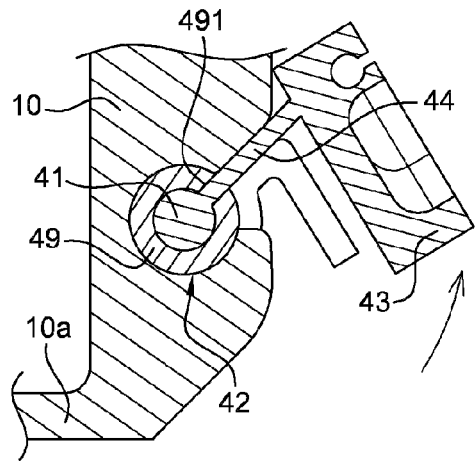
Fig. 5a  Fig. 5b
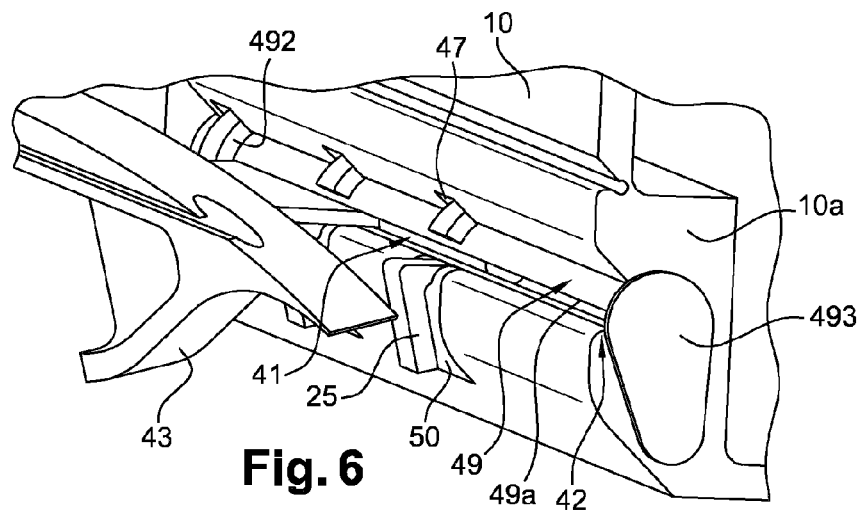
Fig. 6
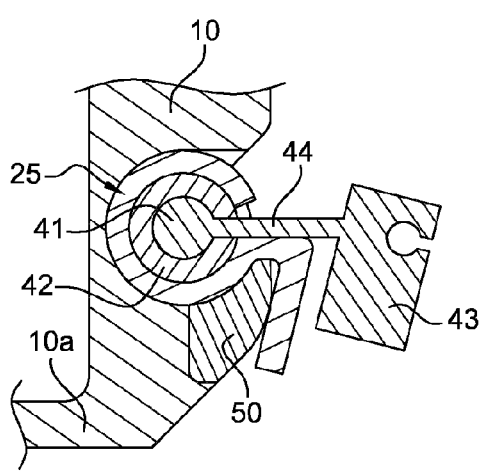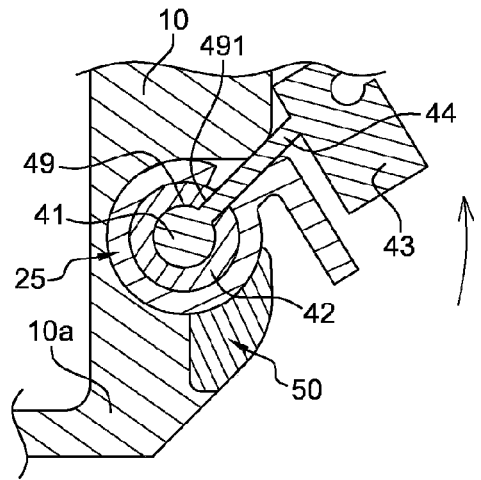
Fig. 7a  Fig. 7b

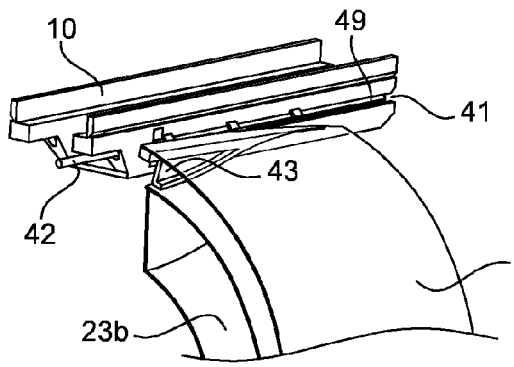
Fig. 15a
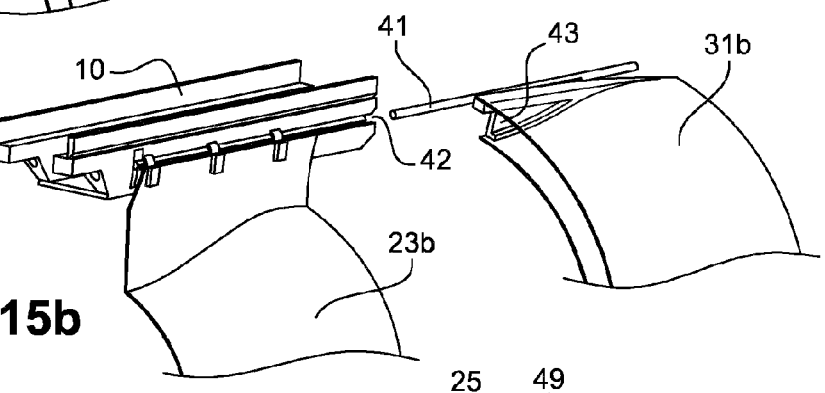
Fig. 15b
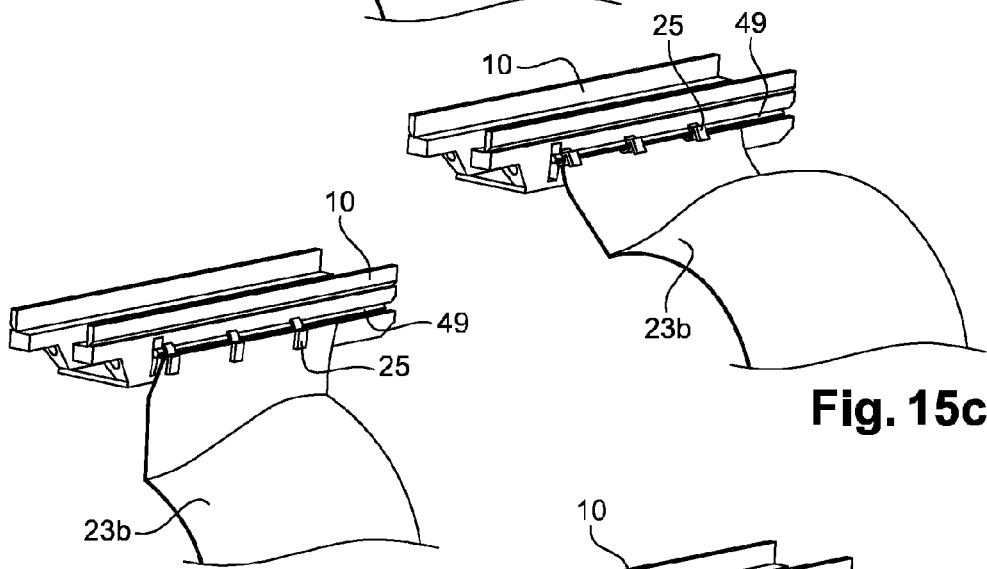
Fig. 15c
Fig. 15d
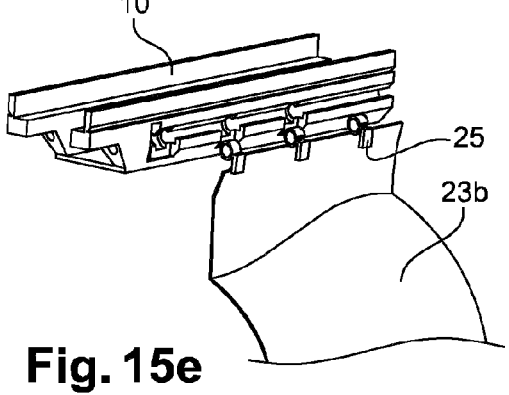
Fig. 15e

REAR NACELLE ASSEMBLY FOR A TURBOJET ENGINE

CROSS-REFERENCE TO RELATED APPLICATIONS

This application is a continuation of International Application No. PCT/FR2012/052005, filed on Sep. 7, 2012, which claims the benefit of FR 11/58247, filed on Sep. 16, 2011. The disclosures of the above applications are incorporated herein by reference.

FIELD

The present disclosure relates to the field of nacelles for aircraft engines and, more particularly, to a rear nacelle assembly for aircraft engine.

BACKGROUND

The statements in this section merely provide background information related to the present disclosure and may not constitute prior art.

An aircraft engine, which is generally of the turbojet engine type, is placed inside a nacelle, which, among other functions:
  provides the aerodynamic fairing of the engine,
  makes it possible to channel the outer air towards the engine,
  makes it possible to connect the engine to the aircraft.

In fact, the nacelle generally, exhibits a tubular structure comprising an air inlet upstream of the turbojet engine, a median section intended to surround a fan of the turbojet engine, a downstream section intended to surround the combustion chamber of the turbojet engine and optionally housing, thrust reversal means.

Modern nacelles are intended to house a dual flow turbojet engine able to generate by means of vanes of the fan in rotation a hot air flow (also called main exhaust flow) coming from the combustion chamber of the turbojet engine and a cold air flow (bypass air) which circulates outside the turbojet engine through an annular passage, also called stream, formed between a fairing of the turbojet engine and an inner wall of the nacelle. The two air flows are ejected from the turbojet engine via the rear of the nacelle.

The downstream section of a nacelle for such a turbojet engine generally exhibits, a fixed outer structure, called Outer Fixed Structure (OFS) and a fixed inner structure, called Inner Fixed Structure (IFS), surrounding a downstream section of the turbojet engine housing the gas generator of the turbojet engine.

The inner and outer fixed structures define the stream intended to channel the cold air flow which circulates outside the turbojet engine.

In a particular case of a grid-type thrust reversal device, the means implemented for reorienting the cold air flow comprise grids for deviating the cold air flow and a mobile cowl moveable between, on the one hand a deployed position in which it opens in the nacelle a passage intended for the deviated cold air flow, and on the other hand, a retractable position in which it closes this passage, the cowl merely having a sliding function aiming to uncover or recover these grids.

Typically, this thrust reversal device comprises two semi-cylindrical half-cowls, mounted in such a manner as to be able, particularly during maintenance work, to be opened "butterfly" by swiveling around a longitudinal hinge line, next to a suspension pylon by which the nacelle is connected to the wing or fuselage of the aircraft. Such a structure is called a C-duct.

The IFS can also be formed of a C-duct structure and be unfolded "butterfly" by swiveling around a longitudinal hinge line, next to the suspension pylon between an operating position and a maintenance position with a view to providing access to the gas generator during maintenance work.

According to an alternative form of the nacelle, a portion of the IFS and the half-cowls must be able to open at the same time in "butterfly", during maintenance work.

Each of the two half-cowls is, hence, slidingly mounted on a longitudinal half-beam support, so-called 12 o'clock beam, pivotally mounted on the pylon, the rotation movement of each half-beam on the pylon providing the swiveling of each half-cowl with respect to this pylon.

Thus, typically, in order to provide these particular movements of the cowl and make possible the fastening of the half-cowls, each half-beam will be provided with rails intended to cooperate with guides mounted on the half-cowls to provide the translation of the related half-cowl and of a plurality of hinge clevises capable of allowing the articulation of the half-beam on the associated pylon.

During maintenance work on the ground, the C-duct type structures have the advantage of providing easy access to the engine after unlocking the holding systems of the half-cowls then swiveling of the latter.

However, although meeting the need of a rapid and easy access to the engine, such a configuration of mounting of the rear nacelle assembly on the pylon has the drawback of significantly weighing down the nacelle as well as having an important size.

Another drawback is the simultaneous opening of the IFS and the cowl which requires the IFS and the cowl to be directly connected together at the top portion of the cowl.

This connection requires the presence of suitable fastening structures which weigh down the nacelle just as much and complicate its assembling.

Nacelles exhibiting other configurations have been developed and particularly O-Duct type nacelles, which have a substantially peripheral cowl and an almost annular shape.

In such a configuration, in operation or during maintenance work, the opening of the cowl can be carried out by sliding along the guiding rails able to be preserved on either side of the suspension pylon, the supporting beams present at a 12 o'clock position and a 6 o'clock position in the C-duct structures which may hence be removed.

In this type of nacelle structure, at least one portion of the inner structure can, itself also be sliding or swiveling along the axis parallel to the sliding axis of the cowl, during maintenance work.

Maintenance of such a configuration is tricky: there is the risk of the cowl getting jammed during its movement.

Furthermore, the access to the rear portion of the engine may be tricky due to the limitation of the sliding towards the rear of the inner structure linked the geometry of the nacelle.

Moreover, such a nacelle structure provides great flexibility to the nacelle, making it more prone to deformation.

SUMMARY

The present disclosure provides a rear nacelle assembly whereof the system for fastening the members constituting the assembly reduces the mass of the nacelle.

The present disclosure also provides a rear nacelle assembly allowing for an easy, fast and simple to implement maintenance of the turbojet engine.

Advantages of the present disclosure include reduction of maintenance time and reducing the risk of the thrust reverser cowl getting jammed during these movements.

The present disclosure provides a rear nacelle assembly for turbojet engine, comprising at least:
an inner structure, intended to surround a downstream portion of the turbojet engine, said inner structure being movable in rotation between an operating position in which it forms the downstream fairing of the turbojet engine and defines an annular stream of cold air with a cowl, and a maintenance position in which it moves away from the downstream portion of the turbojet engine,
said thrust reverser cowl, concentric to said inner structure, said cowl sliding between an opening position clearing the air flow deviation grids and a closing position recovering said air flow deviation grids and,
said cowl further being, mobile in rotation between an operating position wherein it defines the annular cold air stream with said inner structure, and a maintenance position wherein it moves away from the downstream portion of the turbojet engine,
a suspension pylon whereon are mounted said cowl and said inner structure,
this assembly being remarkable in that the cowl is mounted on the pylon by a pivot connection sliding around a main axis and the inner structure is mounted on the pylon by a pivot connection around said main axis.

Thus, thanks to the present disclosure, it is particularly removed any structure of beam type at the 12 o'clock position making it possible to connect the rear nacelle assembly to the suspension pylon as well as any particular structure providing the opening in rotation of the inner structure and any structure connecting the cowl and inner structure at 12 o'clock.

Advantageously, the nacelle is not weighed down.

Concurrently to this advantage the rear nacelle assembly for turbojet engine also facilitates maintenance work on the turbojet engine.

According to other optional features of the rear nacelle assembly according to the present disclosure, taken alone or in combination:
the assembly comprises a system for guiding in translation and in rotation the cowl comprising at least one rail capable of sliding in a guide, the rail being mounted on said cowl and the guide being directly or indirectly mounted on the suspension pylon, or conversely;
the guide or rail, optionally, is preserved on a section fixed to the pylon forming a base of the pylon or on the pylon;
the main axis is the longitudinal axis of the guide;
the assembly comprises a system for guiding in rotation the inner structure comprising means allowing the pivot connection of the inner structure, connecting the inner structure to the guide of the guiding system in translation and in rotation of the cowl, the inner structure being able to be opened in its maintenance position by swiveling around said guide;
the means allowing for the pivot connection of the inner structure comprising one or several hooks, each guide is configured such as to house one or several of these hooks and prevent their translation along the corresponding guide;
the system for guiding in rotation the inner structure further comprises, wedges for blocking the inner structure mounted on the pylon;
the assembly comprises means to simultaneously make the inner structure and the cowl swivel outwards around said guide when the cowl has reached an intermediary position between its closing position and its opening position;
a retainer rod holds each rail and connects it to a longitudinal frame formed between inner and outer portions of the cowl, this rod can be straight or bent;
the cowl and the inner structure are respectively formed of half-cowls and semi-cylindrical half-portions, the movements of the half-cowls and half-portions on either side of the pylon are symmetrical with respect to a longitudinal median plane of the nacelle, the axes of the pivot connections, on either side of the pylon being parallel;
the rear assembly further comprises a rail-guide guiding system, in the lower portion of the nacelle, connecting each half-portion with the corresponding half cowl.
the air flow deviation grids being mounted on each half-cowl, each corresponding half-cowl and deviation grids and half-portion of the inner structure being secured in rotation;
the cowl comprises means for guiding in translation the air flow deviation grids;
the rear assembly further comprises means for actuating the cowl comprising two actuators arranged in the upper portion of the cowl on either side of the suspension pylon in the extension of the guiding rails;
the means for actuating the cowl further comprise an actuator arranged in the lower portion of the cowl, housed in a connecting block connecting each half portion of the inner structure to the corresponding half-cowl;
said lower actuator is carried by only one of the two half-portions of the inner structure.
the rear assembly further comprises anti-jamming means for the rails in the corresponding guides;
said anti-jamming means comprise a gutter housed in the corresponding guide, wherein the rail is placed, said gutter being movable in rotation around the longitudinal axis of the guide and locked in translation in the guide.

The present disclosure further relates to a nacelle comprising a rear assembly such as mentioned beforehand.

Advantageously, the nacelle comprises a fan casing wherein an air flow deviation edge is preserved at its downstream end.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 1a to 1c are perspective views of a nacelle of turbojet engine exhibiting a rear assembly according to the present disclosure comprising a moveable cowl of C-duct type in respectively a closing, intermediary opening and maintenance position of the turbojet engine;

FIGS. 5a and 5b are cross-sectional views of the connection between a half-cowl and the pylon of the rear nacelle assembly according to the present disclosure, in top portion of the nacelle, respectively when the cowl is in operating position and maintenance position;

FIGS. 6 and 8a are perspective views of the connection of FIG. 5a but for the other half-cowl, said half-cowl being invisible on FIG. 6;

FIGS. 7a and 7b are cross-sectional views showing a system for locking the gutters of the connection between an inner half structure and the pylon of the rear nacelle assembly according to the present disclosure, in top portion of the nacelle, respectively when the inner structure is in operating position and maintenance position;

FIG. 8a is a perspective view of the connection, in top portion of the nacelle between a half cowl and the pylon of the rear nacelle assembly according to the present disclosure;

FIGS. 15a to 15e illustrate different successive steps of the removal of a rear nacelle assembly according to the present disclosure.

Figure 2A:
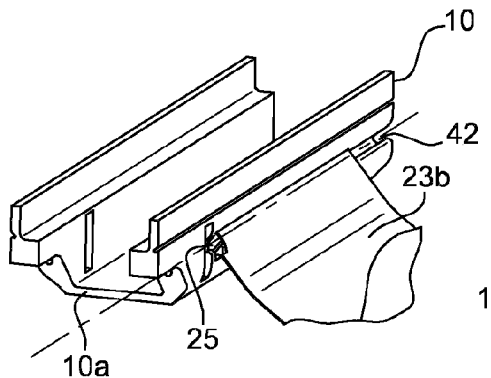
FIGS. 2a and 2b are perspective views of an inner structure of a rear nacelle assembly according to the present disclosure, respectively in maintenance and operating position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

By lower (upper) is meant, the position opposite (respectively in the vicinity) the suspension pylon when the nacelle is mounted under an aircraft wing. The lower (upper) position is usually qualified by 6 o'clock position (respectively 12 o'clock position) with respect to a dial of a clock.

With reference to FIGS. 1a to 1c, an aircraft propulsion assembly 1 comprises a nacelle 2 surrounding a turbojet engine (not illustrated) both exhibiting a main longitudinal axis "A".

This nacelle 2 is intended to be connected under an aircraft wing (non-visible) by means of a suspension pylon 10 oriented upward of the aircraft.

The turbojet engine comprises a fan 3 supplying an annular air flow with a main exhaust flow which supplies the engine driving the fan 3 and bypass air which is ejected into the atmosphere while providing an important fraction of the aircraft thrust.

The fan 3 is contained in an external casing 4 which channels the bypass air downstream, this casing belonging to a median section 6 of the nacelle 2.

In one form, the downstream end of this fan casing 4 provides the deviation edge aerodynamic function.

Thus, any front frame, particularly supporting deviation grids 32, and means for actuating thrust reversal means, described later on, may be removed.

As a reminder, the nacelle 2 typically comprises an outer structure comprising an upstream air inlet structure 5, a median structure 6 surrounding the fan 3 vanes of the turbojet engine, and a downstream structure 20 capable of incorporating thrust reversal means 30.

The downstream structure 20 comprises an outer structure 21 so-called OFS housing the thrust reversal means 30, this outer structure 21 defining with an inner structure 22 comprising a fairing 23 of the engine downstream of the fan vanes, so-called IFS 23, concentric, an annular air stream 7 through which the bypass air is intended to circulate, as opposed to the hot main exhaust flow caused.

The thrust reversal means 30 itself comprises, a cowl 31 mounted moveable in longitudinal translation along a direction that is substantially parallel with the longitudinal axis "A" of the nacelle 2 associated with the air flow deviation grids 32, each exhibiting a plurality of deflecting vanes and shutters (not visible on these figures.) suitable for blocking the annular stream 7 during a thrust reversal.

This cowl 31 is capable of alternatively switching from a closing position (position represented on FIG. 1a) wherein it provides the aerodynamic continuity of the outer lines of the nacelle 2 with the median section 6 and covers the air flow deviation grids 32, to an opening position in which it opens a passage in the nacelle 2 by uncovering the deviation grids 32 capable of reorienting a portion of the bypass air generated by the turbojet engine towards the front of the nacelle 2 through the thus cleared opening.

The position represented in FIG. 1b is an intermediary position of the cowl 31 between its closing and opening position.

Figure 3A:
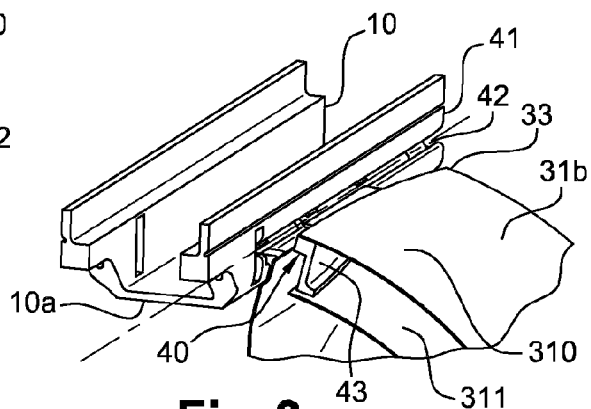
FIGS. 3a and 3b are partial perspective views of a rear nacelle assembly according to the present disclosure, respectively, in operating and maintenance position in a version where the inner cowl and outer cowl are connected.
Figure 3B:
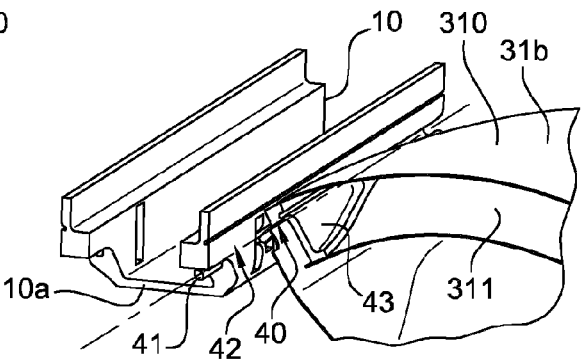

More particularly, in a preferred form of the present disclosure, with reference to FIGS. 1c, 3a and 3b, the cowl 31 comprises two semi-cylindrical half cowls 31a, 31b, exhibiting respectively, upper edges 33 mounted on the suspension pylon 10, as illustrated on FIG. 1c.

The cowl 31 is further capable of switching alternatively from at least an operating position when the aircraft is in operation to a maintenance position (represented on FIG. 1c particularly).

The operating positions correspond to the aforementioned opening and closing positions of the cowl 31, taken by the cowl 31, respectively in direct jet or inverted jet.

With reference particularly to FIGS. 3a, 3b, 5a, 5b, the means 40 for fastening each half cowl 31a, 31b on the pylon 10 are configured to allow the swiveling of the concerned half cowl 31a, 31b between the operating and maintenance positions around a longitudinal axis parallel with the longitudinal axis "A" of the nacelle 2, forming a hinge line.

Furthermore, these fastening means 40 are further configured to allow the sliding of the concerned half cowl 31a, 31b with respect to the suspension pylon 10, between the closing and opening positions of the cowl 31.

The fastening means 40 will be described with respect to a half cowl 31a, 31b only, considering that these means are identical on either side of the pylon 10.

According to a first alternative form, the fastening means 40 comprise a system for guiding in translation and in rotation the half cowl 31a, 31b constituted of a rail 41-guide 42 assembly extending along the longitudinal axis "A" of the nacelle 2, on either side of the suspension pylon 10.

The rail-guide assemblies are simple to implement mounting means.

More particularly, with reference to FIGS. 3a, 3b, 5a, 5b and 6 particularly, a longitudinal rail 41 is arranged in top portion 33 of the concerned half cowl 31a, 31b intended to be mounted on the suspension pylon 10.

Each rail 41 is adapted to allow for the sliding of the half cowl 31a, 31b in a longitudinal guide 41 extending along the longitudinal axis "A" of the nacelle 2, preserved on the pylon 10.

In the exhibited form, each rail 41 is mounted on a longitudinal frame 43, extending along the axis "A" and connecting the inner portion 310 of the concerned half cowl 31a, 31b forming part of the stream 7 and the outer portion 311 of the latter providing the outer continuity of the lines of the nacelle 2.

In another form, the associated guide 42 is mounted on one of the lateral ends of a piece 10a secured to the suspension pylon 10.

This piece 10a is a section extending along the longitudinal axis "A" of the nacelle 2, which may exhibit a transversal U shape section complementary to that of the pylon 10, this section 10a forming the base of the pylon 10.

This section 10a is fastened to the pylon 10 by suitable fastening means.

In a non-limiting example, it can consist of screwing means.

The guides 42 can be preserved in the branches of the U shape extending in a plane including the longitudinal axis of the nacelle 2.

In an alternative form, each guide 42 is directly preserved on one of the lateral ends of the suspension pylon 10 opposite the upper edges 32 of the cowl 31, on either side of the pylon 10.

Thus, the guiding guides 42 can be integrated to the pylon 10, without requiring interface components.

Each guide 42, located in the 12 o'clock position, exhibits a longitudinal axis (in dots) extending in a plane parallel with axis "A".

Thus, the connection between the pylon 10 and each rail 41 is a sliding pivot type connection of axis defined by the longitudinal axis of the corresponding guide 42.

The only possible movement results from the translation and the rotation of the concerned half cowl 31a, 31b, by means of the cooperation of the guiding rail 41 and the guide 42 of the pylon 10, with respect to this axis.

Such a guiding system also defines, the hinge lines of the articulation of each half cowl 31a, 31b.

FIGS. 3a and 3b show the half-cowl 31b respectively, before and after rotation around the longitudinal axis of the guide 42 designated in dots.

On FIGS. 5a and 5b more particularly, the guides 42 are exhibited in the form of longitudinal grooves extending along axis "A", cylindrical, partially open longitudinally on their circumference for the passage of a retainer rod 44 supporting the associated rail 41 connecting it to the longitudinal frame 43.

In still another form, it can be provided that these retainer rods 44 be bent, thus in order to be suited to the diverse aerodynamic configurations encountered on the nacelles and also to have an orientation of the diverse stress reactions that are less liable to cause jamming.

In another alternative form, non-exclusive to the previous one, it can be provided to preserve the guides 42 on the half cowls 31, 31b and the rails 41 on the suspension pylon 10.

Furthermore, with reference to FIGS. 1a to 1c, the cowl 31 surrounds the IFS 23 in a concentric manner along an axis that is collinear to axis "A" of the nacelle 2.

Concerning the IFS 23, it is movable in rotation between an operating position (illustrated in FIG. 1b) wherein it acts as a fairing of the downstream portion of the turbojet engine and a maintenance position wherein it allows the access to said downstream portion (illustrated in FIG. 1c).

The IFS 23 is, thus formed of two half portions 23a, 23b, of form suited to the section of the turbojet engine downstream and, in a non-limiting example, of semi-cylindrical form.

These half portions 23a, 23b making it possible to access a lateral portion of the turbojet engine, on either side of the suspension pylon 10, without entirely opening the IFS.

Advantageously, with reference to FIGS. 2a, 2b, 7a, 7b particularly, each half portion 23a, 23b of the IFS 23 is mounted on the pylon 10 in such a manner as to be opened by swiveling outwards (FIGS. 1c and 2a), by moving apart from the turbojet engine, during maintenance work, around the corresponding guiding system 40 of the half cowls 31a, 31b.

Figure 2B:
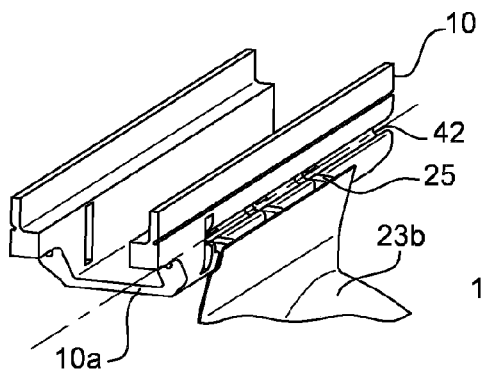

The connection between the pylon 10 and each half portion 23a, 23b of the IFS 23 is of pivot connection type of axis defined by the longitudinal axis of the guide 42 cooperating with the guiding rail 41 of the corresponding half cowl 31a, 31b (this axis being illustrated in dots on FIGS. 2a and 2b).

The only possible movement results from the rotation of each half portion 23a, 23b of the IFS 23 with respect to this longitudinal axis and, consequently, to the pylon 10.

Consequently, the rotation and translation axis pertaining to the connection of a half cowl 31a, 31b and the pylon 10 is identical to the rotation axis pertaining to the connection of the corresponding half portion 23a, 23b and the pylon 10, namely the longitudinal axis of the guide 42 of the guiding system.

Each guiding system is hence configured such that the sliding axis of each rail 41 forms a swiveling hinge line of one of the half portions of the IFS 23 and of the corresponding half cowl 31a, 31b.

The guiding system of the half cowls 31a, 31b on the pylon 10 combines the translation of the cowl 31 and the swiveling of the cowl 31 and the IFS 23 during maintenance work.

Moreover, it is worth noting that the movements of the half cowls 31a, 31b and half-portions of the IFS 23 on either side of the pylon 10 are symmetrical with respect to the longitudinal median plane of the nacelle 2 and the swiveling movements of the half cowls 31a, 31b and half portions of the IFS 23 are possible around one single axis, on either side of the pylon 10.

These two axes, on either side of the pylon 10, are parallel with each other.

In more detail, the system for fastening and guiding the IFS 23 on the pylon 10 is the following.

The guides 42, previously described in relation to the system for guiding the half cowls 31a, 31b are coupled to means 25 allowing the pivot connection between each half portion 23a, 23b of the IFS 23 and the pylon 10, in the 12 o'clock position.

These means 25 may be formed by hooks 25, illustrated in a non-limiting manner three times on FIG. 2b, secured to each half portion 23a, 23b of the IFS 23.

Each guide 42 is configured in such a manner as to house one or several of these hooks 25 and prevent their translation along the corresponding guide 42.

With reference to FIG. 6, each guide 42 comprises, in one form, an imprint 47 of form and dimensions suited to house in its concavity, the corresponding hook 25, each hook 25 exhibiting a C shaped transversal section at its free end.

Thus, each half portion 23a, 23b of the IFS 23 is pivotally mounted on the pylon 10 around the rail 41-guide 42 guiding system and locked in translation with respect to the latter.

In a non-limiting example of the present disclosure, each half portion 23a, 23b of the IFS 23 is pivotally mounted on the pylon 10 around the guides 42 main axes.

With such a system for fastening the IFS 23 and the cowl 31 on the pylon 10, it is advantageously removed any fastening member connecting each half cowl 23a, 23b with the corresponding half portion of the IFS 23.

It is also avoided, the presence of support poles, in the 12 o'clock position, whereon were articulated in the prior art, the downstream section of the nacelle 2 with respect to the suspension pylon 10.

Furthermore, any device dedicated to the articulation of the IFS 23 and the fastening of half portions of the IFS 23 together is removed.

Thus, advantageously, with such removals, it is achieved a weight gain of the nacelle 2 thus, simplifying its implementation.

As regards maintenance work, the steps required for accessing the gas generator of the turbojet engine are reduced, as will be seen further on.

In another form, it may further be provided, means 50 for locking each half portion 23a, 23b of the IFS 23 in operating position: these means may comprise wedges 50 for blocking the IFS 23 with respect to the hooks 25, in lower portion of the guides 42, as illustrated on FIGS. 6, 7a, 7b.

These wedges 50 are mounted on the pylon by suitable means.

In a non-limiting example, these fastening means are screwing means.

These wedges 50 provide a reinforced hold in position of the half portions 23a, 23b of the IFS 23.

Furthermore, in another form of the present disclosure, the deviation grids 32 of the thrust reversal device 30 are retractable at least in part in the median section 6 of the nacelle 2.

Figure 8A:
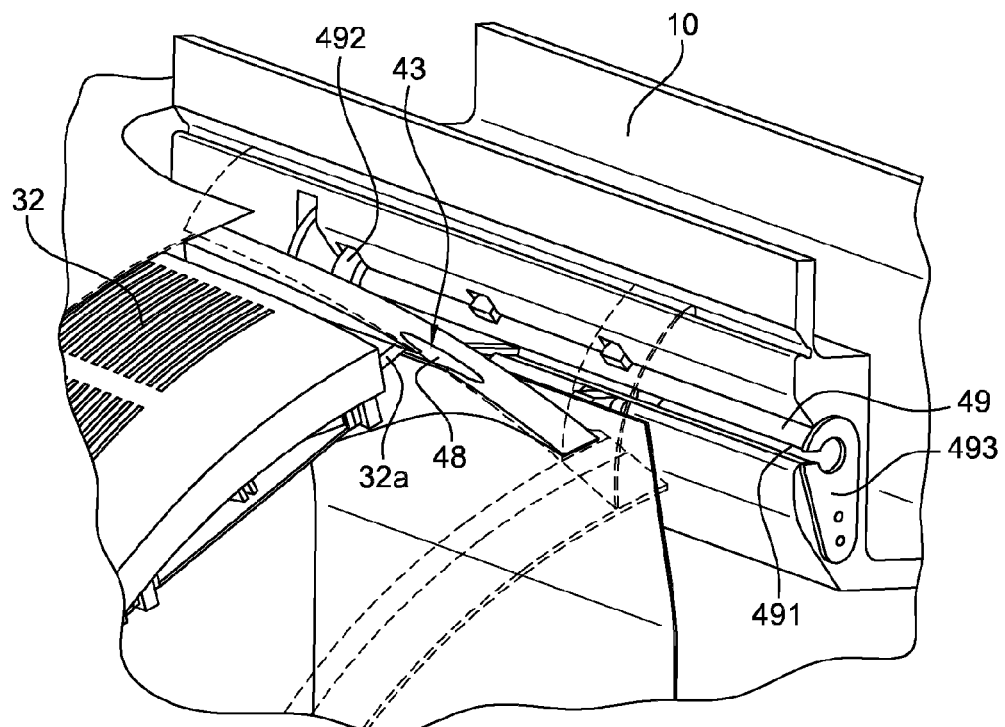
Figure 8B:
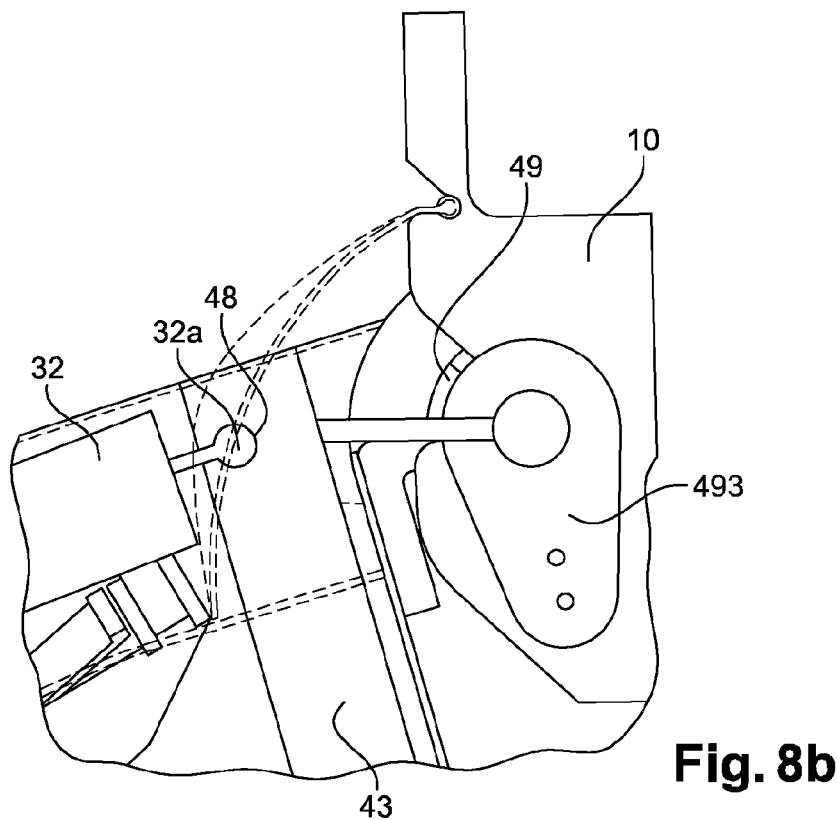
FIG. 8b is an axial view of the connection, in top portion of the nacelle, between a half cowl and the pylon of the rear nacelle assembly according to the present disclosure.

With reference to FIGS. 1c, 8a and 8b, the deviation grids 32 are, thus capable of sliding along an axis parallel with the longitudinal axis "A" of the nacelle 2 from a partial upstream position within the median section 6 of the nacelle 2 to a downstream position, uncovered by the cowl 31 during a thrust reversal.

The means for controlling the sliding of the grids 32 may be independent or not from the means for actuating the sliding of the cowl 31 during said reversal towards its opening position.

In order to make possible the translation movement of the grids 32, each longitudinal frame 43 whereon are mounted the rails 41 of the guiding system 40 of each half cowl 31a, 31b exhibits at least a second guide 48 adapted to cooperate with a rail 32a preserved on an upper end of the set of grids.

Of course, it is also possible to preserve the guides 48 at the ends of the deviation grids 32 and the rails 32a along each longitudinal frame 43 of each half cowl 31a, 31b.

The deviation grids 32 are mounted in a similar manner in top portion of the half cowls 31a, 31b as in lower portion of the latter, in the 6 o'clock position.

Figure 4A:
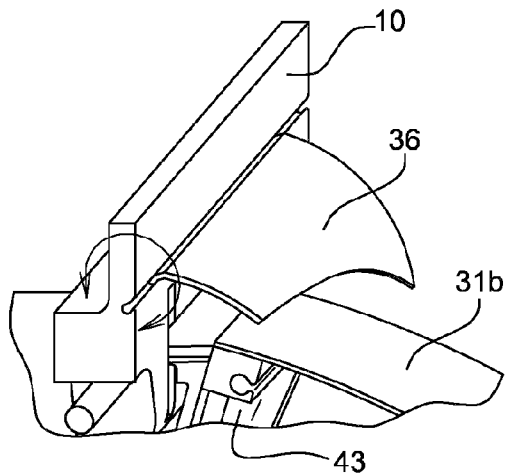
FIGS. 4a and 4b are perspective views of an assembly of aerodynamic sections on a suspension pylon, respectively before and after rotation with respect to this pylon in a version where the inner cowl and outer cowl are independent.
Figure 4B:
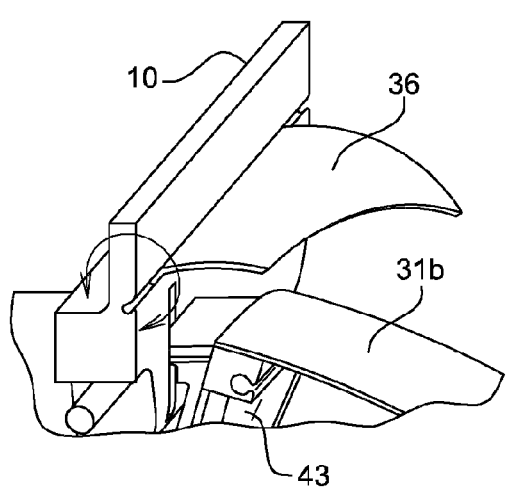

Furthermore, with reference to FIGS. 4a and 4b, in order to provide the aerodynamic continuity of the lines of the nacelle 2, an aerodynamic fairing panel 36 may be mounted on either side of the suspension pylon 10, by surmounting the half cowls 31a, 31b in upper portion.

Each of these panels 36 is hingeably mounted on the pylon 10 along an axis parallel with the longitudinal axis "A", as indicated by the rotation arrow.

The means for actuating the moveable cowl 31 making it possible to achieve its sliding from one to the other positions is represented, in a schematic manner, in FIGS. 1a to 1c and 15a.

In one form of the present disclosure, these means for actuating the cowl 31 comprise two actuators arranged in the upper portion of the moveable cowl, in the 12 o'clock position, on either side of the suspension pylon 10 and an actuator 61 arranged in the lower portion of the cowl 31, in the 6 o'clock position.

These actuators may be of any type, particularly electric, hydraulic or pneumatic actuators.

In a non-limiting example, it is illustrated actuators of linear actuator type with worm drive and rotating screw.

Moreover, in order to reduce the risk of jamming of the guiding system of the cowl 31, and more particularly the buttressing phenomenon between the rails 41 of the half cowls 31a, 31b and the corresponding guides 42, the actuators are mounted in the 12 o'clock position, in the extension of the associated rails 41.

In the 6 o'clock position, in the lower portion of the half cowls 31a, 31b, the actuator 61 is mounted interposed, between the two portions of a connecting block 231, called 6 o'clock bifurcation, connecting each half portion 23a, 23b of the IFS 23 to the corresponding half cowl 31a, 31b, as is described in further detail further down.

The presence of these three actuators makes it possible to prevent any locking in translation of the cowl 31 along the suspension pylon 10 downstream of the nacelle 2 and conversely upstream.

Furthermore, in another form of the present disclosure, still with the purpose of limiting the buttressing phenomenon between the rails 41 of the cowl 31 and the corresponding guides 42 in upper portion of the cowl 31, liable to block the movement of the rails 41 in the corresponding guides 42.

An alternative form of these means for limiting the risk of jamming of the rails, illustrated on FIGS. 5a to 10b, consists in placing each rail 41 in a gutter 49 housed in the corresponding guide 42. This gutter 49 makes it possible to have a stress that is better distributed over the rail 41 by limiting the peak force generated by the substantially horizontal ridge due to the cut-out in the guide 42 allowing the course in rotation of the rail 41.

These means thus comprise, on either side of the pylon 10, a gutter 49 configured to be housed in the system for guiding the cowl 31.

Each of these gutters 49 comes in the form of a tube, pierced by a longitudinal notch 491 intended for the passage of the corresponding rail 41, this tube obviously extending along the suspension pylon 10.

The central axis of the tube corresponding to the central axis of the corresponding rail 41.

With such anti-jamming means of the guiding rails 41, on either side of the pylon 10, the guiding rails 41 cooperate with a dual guide.

Each guiding rail 41 is moveable in translation along the gutters 49, the latter being locked in translation with respect to the corresponding guides 42.

For this, with reference particularly to FIGS. 6 and 8*a*, at an end of each gutter 49, is preserved a shoulder 492 suited to cooperate with a stop preserved on the corresponding guide 42, this stop preventing any translation of the gutter 49.

It is further provided, at the opposite end of the gutter 49 a second stop 493 in the form of an oblong section fixed to the corresponding end of the guide 42.

It is observed that this stop 493 further comprises a shape and dimensions that are complementary to the rail 42 extended from the retainer rod 44 to the longitudinal frame 43 associated with the gutter 49.

Furthermore, each gutter 49 is moveable in rotation around the longitudinal axis of the corresponding guide 42.

Each gutter 49 thus accompanies, the rotational movements of the associated rail 42 causing the cowl 31 to move between the different operating and maintenance positions.

With reference to FIGS. 11 to 14*c*, it can now be noticed, the mounting of the half cowls 31 and half portions 23*a*, 23*b* of the IFS 23, in lower portion, diametrically opposed to the suspension pylon 10.

A lower guiding system connects each half portion 23*a*, 23*b* of the IFS 23 and the corresponding half cowl 31*a*, 31*b*.

More particularly, each half cowl 31*a*, 31*b* exhibits a free lower edge 34, opposite to the upper edge 33, whereon is mounted a guiding section 70 configured such as to exhibit a dual guiding guide 71, 72 each having a central axis parallel with the longitudinal axis "A" of the nacelle.

Each section 70 longitudinally extending on an upstream portion of the half cowl 31*a*, 31*b* and not over its entire length.

One of the guides 72 is provided to provide the movement in translation of the grids 32 in cooperation with a guiding rail mounted on the latter, as aforementioned with regard to the upper portion of the cowl 31.

The second guide 71 is suited to cooperate with a guiding rail 80 mounted on the corresponding half portion 23*a*, 23*b* of the IFS 23.

This last cooperation provides the translation movement along the longitudinal axis "A" of the cowl 31 with respect to the IFS 23, during these opening and closing movements uncovering or not the deviation grids 32.

Figure 14A:
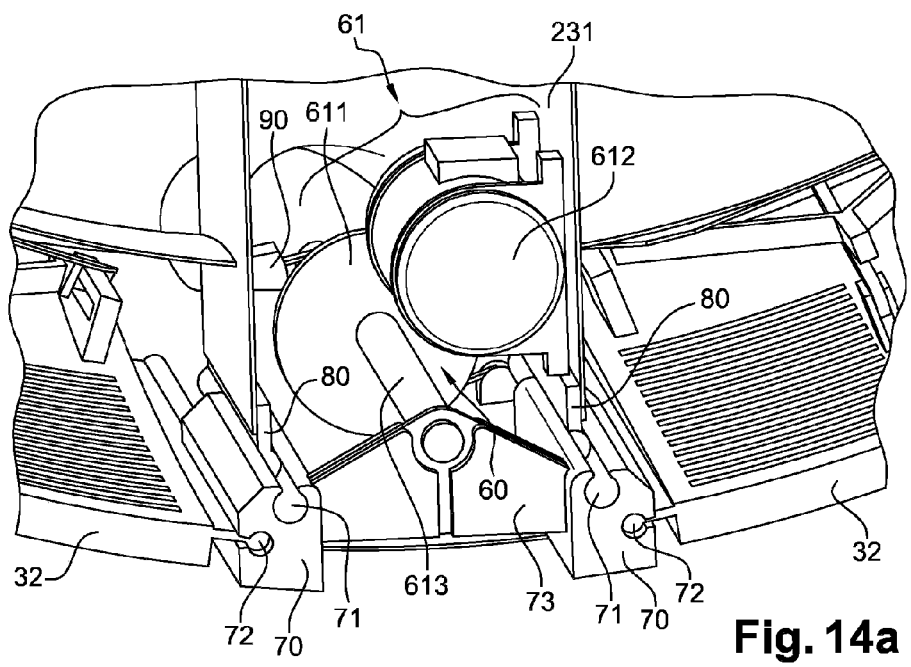

As more particularly illustrated on FIGS. 14*a, b, c*, each guiding rail 80 is mounted on the corresponding half portion of bifurcation 231, vertically extending the lower end of each half portion 23*a*, 23*b* of the IFS 23 and secured to the IFS 23.

Figure 14B:
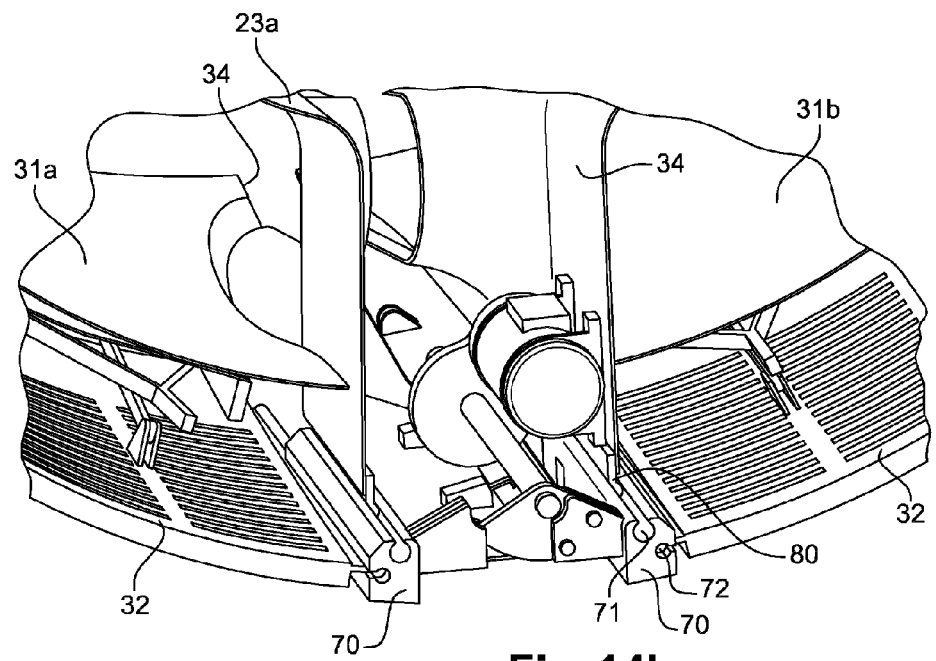
FIGS. 14b and 14c illustrate two steps of successive openings of the connection of FIG. 14a during maintenance work.
Figure 14C:
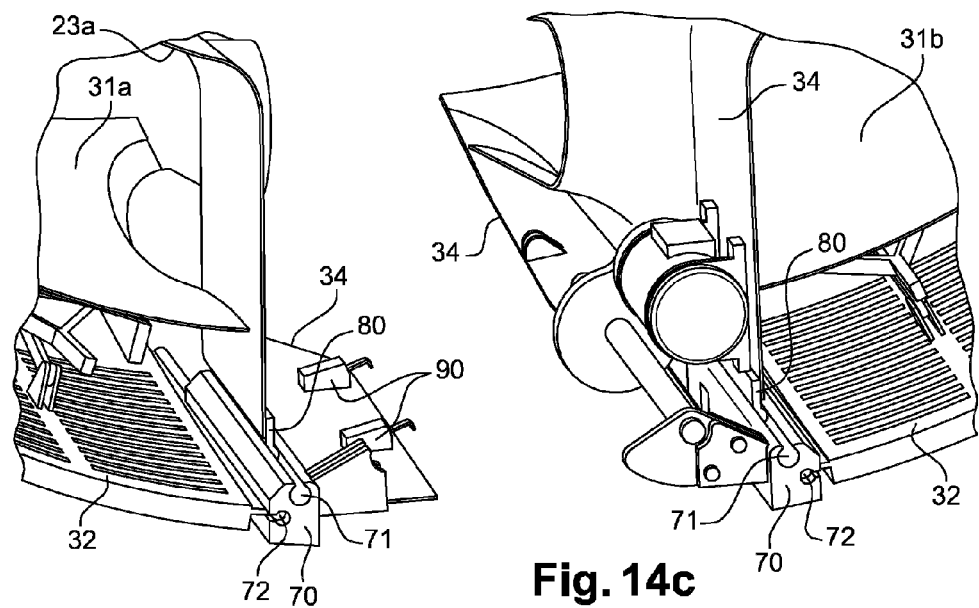

Such mounting of the cowl 31 and of the IFS 23 makes it possible to achieve, on either side of the pylon 10, a unitary assembly of half-shell type, formed by a half cowl 31*a*, 31*b*, the associated grid system 32 and the corresponding half portion 23*a*, 23*b*, of the IFS 23, this assembly being movable in rotation around one single axis defined by the system for guiding the cowl 31 in upper portion of the cowl, as illustrated on FIGS. 14*b* and 14*b*.

Thus, during maintenance work, one may access the downstream portion of the turbojet engine 3 by the lateral opening, outwards of said related unitary assembly, on either side of the pylon 10.

Furthermore, as observed on FIG. 14*a* particularly, the actuator 61 for controlling the movement the cowl is put in place in the concavity of the bifurcation 231 formed when the two half portions 23*a*,23*b* of the IFS are united, thus so that it does not obstruct the opening kinematic of the cowl 31.

In addition, this actuator 61 aids in reducing the blocking risks of the cowl 31 particularly during a reverse jet phase.

This actuator 61 is born by only one of the two half portions 23*a*, 23*b* of the IFS 23 and the corresponding half cowl 31*a*, 31*b*.

More particularly, in the form exhibited, the actuator 61 is a linear actuator with worm drive and rotating screw.

Such an actuator 61 comprising a rotational screw 611 rotationally mounted around the longitudinal axis "A" of the nacelle 2 and driven by an electric engine 612 mounted on one of the bifurcation 231 branches on the half right or left portion of the IFS 23.

The actuator 61 further comprises a translating worm drive 613 provided with a threaded portion, thus in order to be coupled adaptively with the rotational screw 611.

This drive 613 extends along the longitudinal axis "A" of the nacelle, fixed to one of the guiding sections 70, by means of linking member 73 wherein it is housed by means of a support fastened to its free end.

It is placed between the two rail-guide 70, 80 guiding systems to be moved within the bifurcation 231, in the 6 o'clock axis (illustrated in FIG. 13), angularly shifted with respect to the two guiding systems 70, 80.

This worm drive 613 is paired with the second guiding section 70 by means of a second linking section similar to the first, provided with a slit wherein the support of the drive 613 is also housed upon the rotational closure of the half cowls 31*a*, 31*b*.

In an alternative, it may be possible to disconnect the entire section 73 from one side or the other, a pin or groove system allowing the longitudinal drive of the section 70 and the disconnection in opening the cowls 31.

The sliding movement of each rail 80 with respect to its associated guide 71 and consequently the cowl 31, is provided by the worm drive 613, whereof the translation is itself achieved by the rotational screw 611 engaged with the pitch of this drive 613, and driven by the engine 612.

Thus, such an actuator 61 provides the translational movement of each half cowl 31*a*, 31*b* upstream and downstream of the nacelle 2 between its opening and closing positions, thanks to the rotation of the screw 611 driven by the engine 612, said screw 611 being stationary in translation with respect to the IFS 23.

It is worth noting that the mounting of the guiding system and actuator 61 makes it possible to prevent the need of disconnecting the actuator from the guiding system during maintenance work.

In fact, it is observed in FIGS. 14*b* and *c* particularly, that the actuator 61 is secured in rotation with the half portion 23*a*, 23*b* of the IFS 23 whereon it is mounted.

Figure 12:
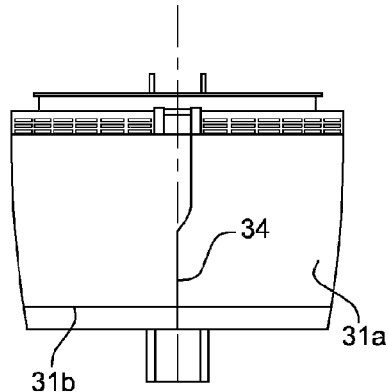
Figure 13:
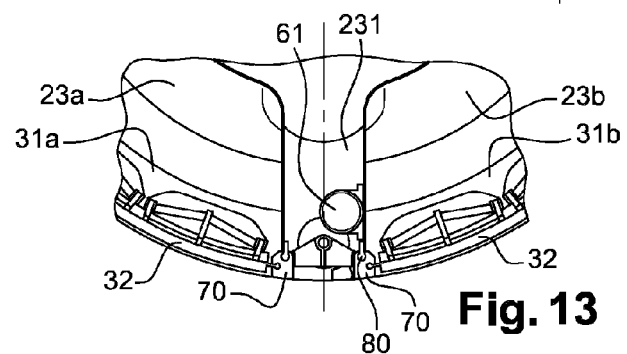
FIGS. 13 and 14a are perspective views of the connection of the inner structure and the cowl of the rear nacelle assembly according to the present disclosure, in lower portion of the nacelle.

Furthermore, as illustrated in FIG. 12, to prevent any interference between the closing of the half cowls 31*a*, 31*b* and the rail/guide guiding system, the junction of the two half cowls 31a, 31b is partly off-axis with respect to the 6 o'clock axis.

On this figure, it is observed the two half cowls 31a, 31b whereof the lower edges 34 are dissymmetrical with respect to the longitudinal median plane of the nacelle delimited in dots.

Thus, means 90 for locking the half cowls 31a, 31b mounted in lower portion of the half cowls 31a, 31b, may be provided for maintaining the half cowls 31a, 31 b closed in lower portion, without hindering the opening/closing kinematic of the latter.

These locking means 90 may be of any type.

In a non-limiting example illustrated on the figures, they comprise a set of hooks on one of the half cowls 31a, 31b suited to cooperate with retaining means mounted on the other of the half cowls 31a, 31b, thus providing the locking of the cowl 31 in lower portion.

In one form, the locking means 90 are regrouped in upstream portion of the half cowls 31a, 31b to release the downstream portions of the latter.

Figure 11:
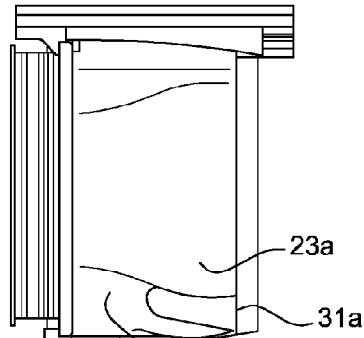
FIGS. 11 and 12 are, respectively, lateral and bottom views of the rear nacelle assembly according to the present disclosure, a portion of the cowl having been removed on FIG. 11.

Furthermore, with reference to FIG. 11, the bifurcation 231 providing the junction between the cowl 31 and the IFS 23 in lower portion exhibits a narrower trailing edge than its leading edge.

In as far as the 12 o'clock beams have been removed, this bifurcation is also longitudinally reduced by around 60% with respect to the bifurcations of the prior art devices.

The operating mode of a rear nacelle assembly according to the present disclosure is the following.

Figure 9A:
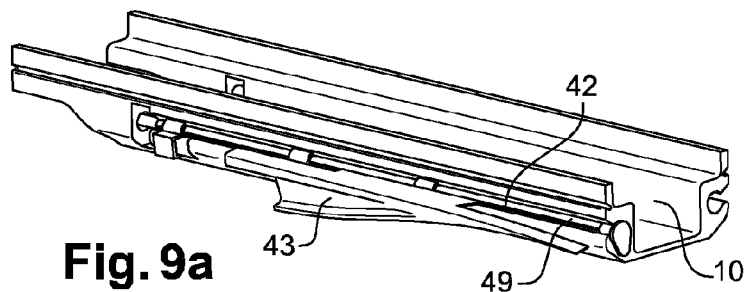
FIGS. 9a and 9b are perspective views of the connection between a half cowl and the pylon of the rear nacelle assembly according to the present disclosure in top portion of the nacelle, respectively when the cowl is in inverted jet and direct jet position.
Figure 9B:
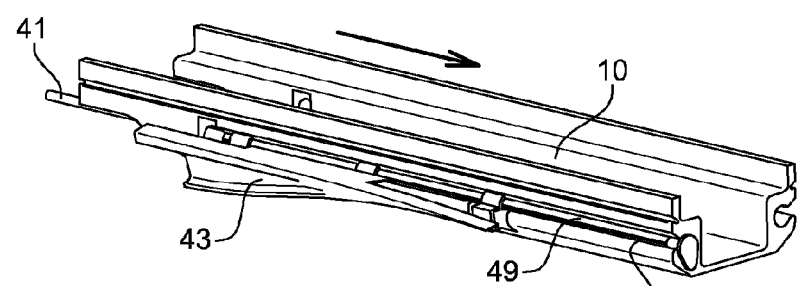

During a thrust reversal illustrated in FIG. 9a, the half cowls 31a, 31b, whereof only a longitudinal frame 43 is represented, locked together in lower portion, move downstream of the nacelle (as indicated by the arrow on FIG. 9b where the cowl 31 is in closing position) in order to uncover the deviation grids 32 and optionally make the shutters swivel in order to block the stream 7 of cold air.

In upper portion, each guiding rail 41 slides in the corresponding guide 42 downstream of the nacelle or if possible in the corresponding gutter 49.

These gutter 49 just like the two half portions of the IFS 23, are blocked in translation during the operating of the nacelle and, particularly in thrust reversal phase.

When maintenance work is required, first, each half cowl 31a, 31b is moved in translation downstream of the nacelle in the direction of its opening position of the cowl 31 corresponding to the aforementioned thrust reversal phase but without reaching this position.

The cowl 31 is in an intermediary position between its closing and opening position, position suited for clearing the cowl 31 from the deviation edge of the fan casing.

Figure 10A:
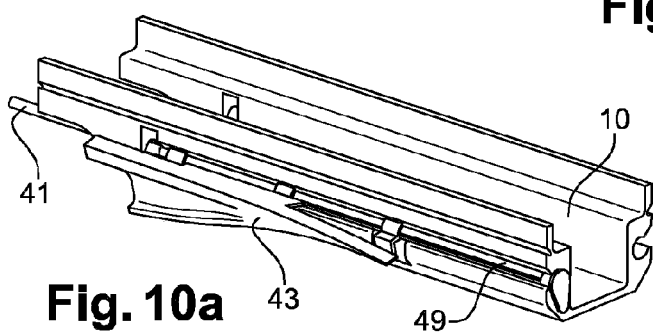
FIGS. 10a and 10b are perspective views of the connection between a half cowl and the pylon of the rear nacelle assembly according to the present disclosure, in top portion of the nacelle, respectively when the cowl is in intermediary maintenance and operating position (direct jet)
Figure 10B:
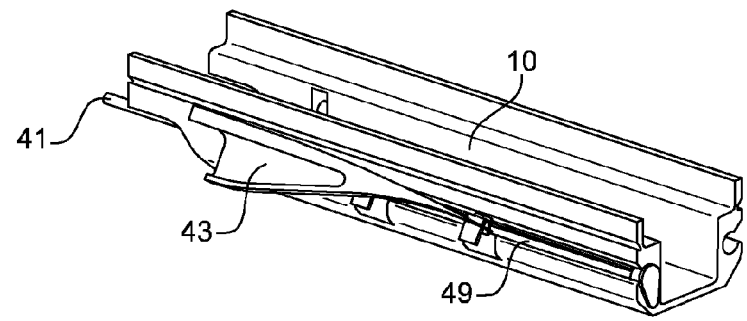

This intermediary position is illustrated in FIG. 10 wherein the longitudinal frame 43 has translated downstream with respect to its position illustrated on FIG. 10b of the cowl 31 in closing position but as long as the translation carried out on FIG. 9a wherein the cowl 31 is in its opening position.

In this intermediary position of the cowl 31, the blocking shutters of the cold air flow stream are not deployed in the latter.

This outer structure having slid, it is prevented any risk of interference with the deviation edge of the fan cowl.

In order to access a lateral downstream portion of the gas generator, the half shell or shells are swiveled to the outside of the turbojet engine, namely, the concerned assembly of the half cowl 31a—deviation grids 31—half portion 23a, 23b of the IFS 23, secured in rotation, around the sliding axis of the corresponding half cowl 31.

During this swiveling, if possible, the gutters 49 also swivel around the sliding axis of the corresponding half cowl 31 just like the hooks 25 of the half portion of the IFS 23.

Thus, a rapid, simple and effective access is achieved to the turbojet engine for maintenance work.

In fact, it is not necessary to make the cowl slide to its closing position and the unitary aspect in rotation of each half shell makes possible the rapid access to the core of the turbojet engine.

For more advances maintenance work, the turbojet engine is cleared in the following manner, whereof certain steps are illustrated on FIGS. 15a to 15e.

First, the deviation grids are disconnected from each half cowl 31a, 31b.

Then, the different actuators 60 are disconnected in upper portion from the guiding systems of the half cowls 31a, 31b.

Hence, the related half cowl 31a, 31b is removed simultaneously with the deviation grids it bears, from the suspension pylon 10, by particularly releasing the rails 41 of the cowl 31 of the guides 42 of the pylon 10, by translating them downstream of the nacelle 2 (FIG. 15b).

The blocking wedges are dismantled from the IFS 23, after having made the half portions 23a, 23b of the IFS 23 swivel into maintenance position.

The blocking wedges having been removed (FIG. 15c), the half portion 23a, 23b of the IFS is replaced into operating position, by an inverted swiveling (FIG. 15d).

It is laterally removed, as such the gutter 49 from the corresponding guide 41 (passage from FIGS. 15d to 15e).

The same is then carried out with the half portion 23a, 23b of the IFS 23, provided with its hooks 25.

The half shell assembly is, at this stage, entirely separated from the suspension pylon 10.

It goes without saying that the present disclosure is not limited to the forms of the aforementioned rear nacelle assembly, by way of examples but it encompasses all the alternatives.

What is claimed is:

1. A rear assembly for a nacelle of a turbojet engine, comprising:
 an inner structure surrounding a downstream portion of the turbojet engine, said inner structure being movable in rotation between an operating position in which the inner structure forms a downstream fairing of the turbojet engine and defines an annular stream of cold air with a thrust reverser cowl, and a maintenance position in which the inner structure moves away from the downstream portion of the turbojet engine; and
 a suspension pylon whereon are mounted said thrust reverser cowl and said inner structure,
 wherein said thrust reverser cowl, concentric to said inner structure, slides between an opening position clearing air flow deviation grids and a closing position recovering said air flow deviation grids,
 said thrust reverser cowl further being mobile in rotation between an operating position where the thrust reverser cowl defines the annular cold air stream with said inner structure, and a maintenance position where the thrust reverser cowl moves away from the downstream portion of the turbojet engine,
 wherein the thrust reverser cowl and the inner structure are slidably and pivotably connected to the suspension pylon by a pivot connection, wherein the suspension pylon defines an elongated cutout extending along a main axis of the suspension pylon and recessed from an outer surface at a mounting location of the thrust reverser cowl and the inner structure for slidably receiving the pivot connection therein such that the pivot connection is directly embedded into the suspension pylon.

2. The rear assembly according to claim 1, wherein the rear assembly comprises a system for guiding in translation and in rotation the thrust reverser cowl comprising at least one rail capable of sliding in a guide, the at least one rail being mounted on said thrust reverser cowl and the guide being directly or indirectly mounted on the suspension pylon, wherein the rail and the guide form the pivot connection.

3. The rear assembly according to claim 2, wherein the guide or the at least one rail is preserved on a section fastened to the suspension pylon forming a base of the suspension pylon or on the suspension pylon.

4. The rear assembly according to claim 2, wherein the main axis is a guide longitudinal axis.

5. The rear assembly according to claim 2, wherein the rear assembly comprises a system for guiding in rotation an inner structure comprising the pivot connection, connecting the inner structure to the guide of the guiding system in translation and in rotation of the thrust reverser cowl, the inner structure being able to be opened towards its maintenance position by swiveling around said guide.

6. The rear assembly according to claim 5, wherein the pivot connection of the inner structure comprises at least one hook, each guide configured such as to house the at least one hook and prevent translation of the at least one hook along a corresponding guide.

7. The rear assembly according to claim 5, wherein the system for guiding in rotation the inner structure further comprises wedges for blocking the inner structure, the wedges being mounted on the suspension pylon.

8. The rear assembly according to claim 2, wherein the rear assembly comprises a swivel device to swivel simultaneously the inner structure and the thrust reverser cowl outward around said guide when the thrust reverser cowl has reached an intermediary position between its closing and opening position.

9. The rear assembly according to claim 2, wherein a retainer rod supports each rail and connects the rail to a longitudinal frame formed between inner and outer portions of the thrust reverser cowl, the retainer rod capable of being straight or bent.

10. The rear assembly according to claim 2, wherein the thrust reverser cowl and the inner structure are formed respectively of half cowls and semi-cylindrical half portions, movements of the half cowls and half portions on either side of the suspension pylon are symmetrical with respect to a longitudinal median plane of the nacelle, and the main axis, on either side of the suspension pylon, being parallel to the median plane.

11. The rear assembly according to claim 10, wherein the rear assembly further comprises a rail/guide guiding system in lower portion of the nacelle, connecting each half portion and the corresponding half cowl.

12. The rear assembly according to claim 10, wherein the grids for deviating the air flow being mounted on each half cowl, each half cowl, the corresponding deviation grids and the half portion of the inner structure are secured in rotation.

13. The rear assembly according to claim 10, wherein the rear assembly further comprises actuators for actuating the thrust reverser cowl comprising two actuators arranged in the upper portion of the cowl on either side of the suspension pylon, in the extension of the guiding rails.

14. The rear assembly according to claim 13, further comprising an actuator arranged in the lower portion of the cowl, housed in a connecting block connecting each half portion of the inner structure to the corresponding half cowl.

15. The rear assembly according to claim 14, wherein said lower actuator is born by one of the two half portions of the inner structure.

16. The rear assembly according to claim 2, wherein the thrust reverser cowl comprises a guiding device for guiding in translation the grids for deviating the air flow.

17. The rear assembly according to claim 2, wherein the rear assembly further comprises an anti-jamming device of the rails in the corresponding guides.

18. The rear assembly according to claim 17, wherein said anti-jamming device comprises a gutter housed in the corresponding guide, wherein the rail is placed, said gutter being moveable in rotation around a longitudinal axis of a slide and blocked in translation in the guide.

19. A nacelle comprising the rear assembly according to claim 1 positioned at the rear of the nacelle.

20. The nacelle according to claim 19, further comprising a fan casing wherein an air flow deviation edge is preserved in its downstream end.

* * * * *